US011225047B2

(12) United States Patent
Redmond et al.

(10) Patent No.: US 11,225,047 B2
(45) Date of Patent: Jan. 18, 2022

(54) SKIN-FOAM-SUBSTRATE STRUCTURE VIA INDUCTION HEATING

(71) Applicant: International Automotive Components Group North America, Inc., Southfield, MI (US)

(72) Inventors: Douglas E. Redmond, Chesterfield, MI (US); Giachinno G. Bedogne, Troy, MI (US); Matt Starling, Sandusky, OH (US); Rose A. Ryntz, Clinton Township, MI (US)

(73) Assignee: INTERNATIONAL AUTOMOTIVE COMPONENTS GROUP NORTH AMERICA, INC., Southfield, MI (US)

( * ) Notice: Subject to any disclaimer, the term of this patent is extended or adjusted under 35 U.S.C. 154(b) by 0 days.

(21) Appl. No.: 15/922,794

(22) Filed: Mar. 15, 2018

(65) Prior Publication Data
US 2018/0264777 A1    Sep. 20, 2018

Related U.S. Application Data

(60) Provisional application No. 62/471,428, filed on Mar. 15, 2017.

(51) Int. Cl.
| | |
|---|---|
| B32B 5/20 | (2006.01) |
| B32B 27/14 | (2006.01) |
| B32B 27/32 | (2006.01) |
| C08J 9/228 | (2006.01) |
| C08J 9/00 | (2006.01) |
| C08J 9/08 | (2006.01) |
| C08J 9/34 | (2006.01) |
| C08J 9/10 | (2006.01) |

(52) U.S. Cl.
CPC ............... *B32B 5/20* (2013.01); *B32B 27/14* (2013.01); *B32B 27/32* (2013.01); *C08J 9/0066* (2013.01); *C08J 9/228* (2013.01); B32B 2264/105 (2013.01); B32B 2266/025 (2013.01); B32B 2266/0221 (2013.01); B32B 2266/0278 (2013.01); B32B 2266/0292 (2013.01); B32B 2307/72 (2013.01); B32B 2310/0812 (2013.01); B32B 2323/10 (2013.01); C08J 9/08 (2013.01); C08J 9/103 (2013.01); C08J 9/34 (2013.01); C08J 2201/034 (2013.01); C08J 2203/02 (2013.01); C08J 2203/04 (2013.01); C08J 2323/02 (2013.01); C08J 2323/08 (2013.01); C08J 2323/12 (2013.01); C08J 2323/16 (2013.01); C08J 2331/04 (2013.01); C08J 2375/04 (2013.01); C08J 2409/06 (2013.01); C08J 2423/02 (2013.01); C08J 2425/10 (2013.01); C08J 2427/06 (2013.01); C08J 2467/00 (2013.01)

(58) Field of Classification Search
CPC ........... B32B 5/20; B32B 27/32; B32B 27/14; B32B 2323/10; B32B 2264/105; B32B 2266/0221; B32B 2310/0812; B32B 2307/72; B32B 2266/0292; B32B 2266/0278; B32B 2266/025; C08J 9/0066; C08J 9/228; C08J 2467/00; C08J 2427/06; C08J 2425/10; C08J 2423/02; C08J 2409/06; C08J 2375/04; C08J 2331/04; C08J 2323/16; C08J 2323/12; C08J 2323/08; C08J 2323/02; C08J 2203/04; C08J 2203/02; C08J 9/34; C08J 9/08; C08J 9/103; C08J 9/08; C08J 2201/034
USPC .............................................. 156/79, 78, 77
See application file for complete search history.

(56) References Cited

U.S. PATENT DOCUMENTS

| | | | | |
|---|---|---|---|---|
| 3,086,247 | A * | 4/1963 | Rubens | C08J 9/0066 |
| | | | | 264/418 |
| 3,803,274 | A * | 4/1974 | Nakashima | B29D 99/0053 |
| | | | | 264/420 |
| 3,902,940 | A | 9/1975 | Heller, Jr. et al. | |
| 4,969,968 | A * | 11/1990 | Leatherman | B29C 65/1425 |
| | | | | 156/272.4 |
| 6,056,844 | A * | 5/2000 | Guiles | B29C 35/08 |
| | | | | 156/272.4 |
| 6,552,095 | B1 * | 4/2003 | Tochioka | B05D 1/18 |
| | | | | 521/54 |
| 6,939,477 | B2 | 9/2005 | Stark et al. | |

(Continued)

FOREIGN PATENT DOCUMENTS

| | | |
|---|---|---|
| FR | 2129967 A | 11/1972 |
| JP | H07145357 A | 6/1995 |

(Continued)

OTHER PUBLICATIONS

Chen, S-C. et al ; Advanced Injection Molding Technologies (48 pages); Hanser Publications, "Introduction to Injection Molding", by Shia-Chung Chen. Section 6.4.7 Induction Heating from the Mold Interior Using Embedded Coils, p. 220-224.

Hinzpeter, U, et al; "Use of Induction Heating in Plastics Injection Molding; Advances in Induction and Microwave Heating of Mineral and Organic Materials"; ResearchGate; Feb. 2011; Chpt 16, pp. 339-344; DOI: 10.5772/13842—Source: InTech.

(Continued)

*Primary Examiner* — Francisco W Tschen
*Assistant Examiner* — Abhishek A Patwardhan
(74) *Attorney, Agent, or Firm* — Steven J. Grossman; Grossman, Tucker, Perreault & Pfleger PLLC

(57) ABSTRACT

A method of forming a skin-foam-substrate type structure particular suitable as an automobile trim component. The method comprises supplying a polymer resin containing a chemical foaming agent and including metal particles capable of inductive heating, that is positioned between a polymeric skin and substrate, followed by inductive heating to cause foaming of the polymeric resin. The foamed polymer resin adheres to the skin and substrate.

14 Claims, No Drawings

(56) References Cited

U.S. PATENT DOCUMENTS

| | | |
|---|---|---|
| 7,419,631 B2 | 9/2008 | Guichard et al. |
| 7,528,733 B2 | 5/2009 | Guichard et al. |
| 7,679,036 B2 | 3/2010 | Feigenblum et al. |
| 7,984,738 B2 * | 7/2011 | LaMarca ............ B29C 66/91411 156/359 |
| 8,657,595 B2 | 2/2014 | Feigenblum et al. |
| 8,794,950 B2 | 8/2014 | Feigenblum et al. |
| 8,840,748 B2 | 9/2014 | Staiger et al. |
| 8,926,887 B2 | 1/2015 | Guichard et al. |
| 9,061,445 B2 | 6/2015 | Hinzpeter |
| 9,248,598 B2 | 2/2016 | Guichard et al. |
| 2004/0058027 A1 | 3/2004 | Guichard et al. |
| 2005/0245193 A1 | 11/2005 | Guichard et al. |
| 2007/0267405 A1 | 11/2007 | Feigenblum et al. |
| 2008/0230957 A1 | 9/2008 | Feigenblum et al. |
| 2009/0004466 A1 | 1/2009 | Lamarca et al. |
| 2010/0201040 A1 | 8/2010 | Guichard et al. |
| 2011/0057357 A1 | 3/2011 | Feigenblum et al. |
| 2011/0173889 A1 | 7/2011 | Guichard et al. |
| 2011/0233826 A1 | 9/2011 | Guichard et al. |
| 2011/0273889 A1 | 11/2011 | Boomgaarden et al. |
| 2011/0274921 A1 | 11/2011 | Li et al. |
| 2012/0025428 A1 | 2/2012 | Feigenblum et al. |
| 2012/0070526 A1 | 3/2012 | Hinzpeter |
| 2012/0128809 A1 | 5/2012 | Guichard et al. |
| 2014/0023828 A1 | 1/2014 | Feigenblum et al. |
| 2014/0183178 A1 | 7/2014 | Guichard et al. |
| 2015/0151471 A1 | 6/2015 | Feigenblum et al. |
| 2015/0165665 A1 | 6/2015 | Guichard et al. |
| 2016/0101551 A1 | 4/2016 | Guichard et al. |
| 2016/0322552 A1 | 11/2016 | Miki |
| 2017/0002167 A1 * | 1/2017 | Shimura ................ B32B 27/32 |

FOREIGN PATENT DOCUMENTS

| | | |
|---|---|---|
| JP | H0948036 A | 2/1997 |
| JP | 2000025060 A | 1/2000 |
| JP | 2008133403 A | 6/2008 |
| JP | 4994807 B2 | 8/2012 |
| JP | 2013509464 A | 3/2013 |
| JP | 06206442 A | 9/2017 |

* cited by examiner

SKIN-FOAM-SUBSTRATE STRUCTURE VIA INDUCTION HEATING

CROSS REFERENCE TO RELATED APPLICATIONS

This application claims the benefit of the filing date of U.S. Provisional Application Ser. No. 62/471,428, filed Mar. 15, 2017, the teachings of which are incorporated herein by reference.

FIELD

The present invention relates to the use of induction heating for the formation of a skin-foam-substrate structure that is particularly suitable to serve as a vehicular trim panel. More specifically, induction heating is utilized to selectively cause foaming of a chemical foaming agent dispersed in a polymeric resin positioned between the skin and substrate. The foam layer as formed adheres to the skin and substrate material and the skin and substrate do not experience overheating or significant thermal degradation.

BACKGROUND

Induction heating of polymeric material has been disclosed, which involves mixing of ferromagnetic particles in the polymer to be heated. Temperature control is obtained by selecting ferromagnetic particles with a specific Curie temperature (Tc). The ferromagnetic particles heat up in an induction field, through hysteresis losses, until they reach their Curie temperature (Tc). At that point heat generation through hysteresis loss ceases. See, e.g., U.S. Pat. No. 6,056,844.

U.S. Pat. No. 7,984,738 entitled "Temperature Controlled Polymer Composition For Inductive Control Heating Using Electrical-Conductive And Magnetic Particles" reports on the combination of a polymer matrix material and magnetic particles. The composition is selectively magnetically heatable by an electrical induction energy frequency that is pulse width modulated through variable time cycles to provide controlled heating.

U.S. Pat. Publication No. 2017/0002167 entitled "Foamable Particle And Method Of Use" reports on a physically crosslinked foamable particle that comprise a polyolefin resin and a chemical foaming agent, the foamable particle having a volume of at least about 0.002 mm$^3$.

SUMMARY

The present invention is directed at a method to form a skin-foam-substrate type structure that is particularly suitable as an automotive trim component. The method comprises supplying a polymer resin containing a chemical foaming agent including metal particles that are capable of inductive heating. The polymer resin containing the chemical foaming agent and metal particles is positioned between a polymeric skin and substrate. Inductive heating is applied that selectively heats the chemical foaming agent causing foaming of the polymeric resin. The foamed polymer resin then adheres to the skin and substrate.

DETAILED DESCRIPTION OF PREFERRED EMBODIMENTS

As noted, the present invention stands directed at a method to form a skin-foam-substrate type structure. Such structure is particularly suitable for the formation of a vehicular trim component, such as an automotive instrument panel, door panel, headliner, console component, etc.

The skin material that may be employed herein is preferably selected from a polymeric material, such as a polyolefin (polyethylene or polypropylene), poly(vinyl chloride), or polyurethane. In addition, the skin material may be selected from any thermoplastic elastomer material, which may similarly include polyolefins (TPO), styrene-butadiene copolymers (SBC), styrene-ethylene-butadiene styrene (SEBS), polyesters (TPE) as well as thermoplastic polyurethanes (TPU). Elastomer is general reference to the feature that the material is flexible at room temperature, or that the polymer resin, at room temperature, is amorphous and above its glass transition temperature (Tg).

Preferably, the skin material is a thermoplastic polyolefin elastomer (POE). Such polyolefin elastomers are reference to the copolymerization of ethylene with a secondary monomer, such as 1-octene or 1-butene, via metallocene type polymerization, to provide densities that are less than or equal to 0.90 g/cc, such as in the range of 0.80 g/cc-0.90 g/cc, or more preferably, 0.85 g/cc to 0.90 g/cc. Melt flow index values may range from 0.1 to 35. Melting temperatures for the POE are relatively low, and preferably less than or equal to 100° C., such as in the range of 35° C. to 100° C., more preferably 50° C. to 100° C. Tg values, measured by DSC, may range from −40° C. to −60° C. Preferably, the POE skin material will have a thickness that falls in the range of 0.5 mm to 1.5 mm, more preferably, 0.6 mm to 1.2 mm.

The substrate material is preferably selected from polymer, metal, or composite material (polymeric material with fiber or particle reinforcement). Preferred polymeric materials include acrylonitrile-butadiene-styrene (ABS), polycarbonate (PC), PC-ABS type blends, or polyolefin with reinforcement, such as glass filled polypropylene.

The polymer resin suitable for foaming may also include a polyurethane type resin. It may also preferably include polyolefin resin, including but not limited to low density polyethylene (LDPE), linear low density polyethylene (LLDPE), ethylene-vinyl acetate (EVA), polypropylene (PP), ethylene propylene diene monomer (EPDM), thermoplastic olefin (TPO), thermoplastic elastomer (TPE) and rubber (polyisoprene). The polymer resin for use as a foam material may itself be crosslinked, where the polymer resin indicates a gel content in the range of 15% to 85%. In such regard, reference is made to U.S. Pat. Publ. 2017/0002167, which discloses a crosslinked foamable particle that may preferably be employed herein, and whose teachings are incorporated by reference. The polymer resin utilized for foaming is preferably in particle form, at a diameter in the range of 100 µm to 2000 µm (2.0 mm).

The chemical foaming agent that may be employed herein include any chemical compound that will respond upon exposure to heat to provide foaming of the above described polymer resin. Suitable foaming agents include, but are not limited to, azodicarbonamide (ADCA), sodium bicarbonate, calcium carbonate, or a blend thereof. Preferably the level of foaming agent in the polymer resin is in the range of 5.0 wt. % to 15.0 wt. %, more preferably 8.0% (wt.) to 12.0% (wt). In addition, the chemical foaming agent is one that is preferably one that will initiate and cause foaming in the temperature range of 375° F. to 425° F.

The metallic particles described herein, that are susceptible to inductive heating, are those that are capable of reaching temperatures in the range of 375° F. to 425° F. to trigger foaming. In addition, the temperature of the particles may be such that inductive heating raises their temperatures in the range of 375° to 600° F. The metal particles noted herein that may therefore be utilized are preferably any metal particles that will interact with an electromagnetic field to provide such targeted heating. Such particles therefore are preferably formed from ferromagnetic materials. Such particles may therefore include nickel, iron, cobalt, and rare earth metals. Preferably, 0.5% by weight to 50.0% by weight of such particles are combined with the polymer resin suitable for foaming, more preferably 5.0% by weight to 20.0% by weight. Accordingly, the polymer resin suitable for foaming may be present at a level of 99.5% by weight to 50.0% by weight. The metal particles themselves may preferably have a diameter of 10 nanometers to 500 nanometers. However, reference to metal particles herein should be understood as metal in any particular geometric form, such as particles that may have relatively high aspect ratios (length/diameter) of up to and including 75.

It is therefore now worth noting that with respect to the formation of the skin-foam-substrate structure, the thickness of the foam layer is contemplated to fall in the range of 0.2 mm to 5.0 mm. More preferably, the thickness of the foam layer may fall in the range of 0.2 mm to 2.0 mm, or in the range of 0.2 mm to 1.0 mm. The foam also is contemplated to have the following additional characteristics: density 2.0 pcf to 4.0 pcf; Shore 00 hardness 40-60; 25% compression deflection (psi) 10-15; peel strength (psi) 2-4; 60° C. thermal stability 0% weight loss]; 80° C. thermal stability [1.0% to 2.0% weight loss]; 100° C. thermal stability [3.0% to 5.0% weight loss]; room temperature tensile (psi) 25-75 psi; room temperature elongation (%) 75-100; 50% comp. deflection (psi) 7-10.

As alluded to above, preferably, the foaming material is a crosslinked polypropylene material initially present at a preferred particle size in the range of 100 microns to 2000 microns, more preferably at 250 microns to 1.0 mm. Such particles preferably contain 8.0% (wt.) to 12.0% (wt) of azodicarbonamide. In addition, the azodicarbonamide is preferably pre-compounded into the foaming material. The combined particle of cross-linked polypropylene and azodicarbonamide is then blended with 5.0% by weight to 20.0% by weight of, as noted above, particles to trigger inductive heating, which preferably may comprise a graphite based material that includes ferromagnetic material such as Fe.

In addition to all of the above, it is noted herein that in forming the skin-foam-substrate structure herein, by way of inductive heating and formation of what can be described as the foam core, the skin and substrate material are not contemplated to experience overheating and therefore undergo any significant thermal history or potential thermal degradation (e.g. a loss in tensile strength of greater than or equal to 5.0%, or greater or equal to 2.5%, from the tensile strength prior to foaming). For example, the temperature of the skin and substrate are such that during the foaming step, the skin and substrate do not exceed a temperature of 100° F. Preferably, during the step of foaming the skin and substrate are such that they will remain in the temperature range of room temperature (~25° F.) to 150° F., or in the range of room temperature to 100° F., where such temperature is measured at the surface of the skin or substrate, where the foam ultimately comes into contact with the skin and substrate materials used in the skin-foam substrate structure. Moreover, the use of inductive heating to cause foaming herein is contemplated to maintain the skin and substrate at room temperature, plus no more than a 30° F. rise, or no more than a 20° F. rise, or no more than a 10° F. rise in temperature during the formation of the foam core.

In one particularly preferred example, the temperature rise for the above preferred use of crosslinked polypropylene particles containing chemical foaming agent (azodicarbonamide) was observed to vary based upon the power used for inductive heating and foaming. For example, 500 watts was observed to heat the material for foaming from 73° F. to 480° F. in 24 seconds. For a 2 inch×2 inch×3 mm reservoir of particles for foaming with a 15.0% by weight loading of conductive particles, and employing 3000 watts of power, foaming as complete after 12.5 seconds with a temperature rise of about 380° F. Accordingly, in the broad context of the present invention, foaming is preferably completed in less than or equal to 60 seconds, more preferably less than or equal to 45 seconds, or less than or equal to 30 seconds, or less than or equal to 15 seconds.

Moreover, the above system (crosslinked polypropylene particles containing chemical foaming agent) confirmed that inductive heating to provide foaming could be achieved while retaining the integrity and grain of the polyolefin (i.e. polypropylene) skin material. That is, during foaming, the crosslinked polypropylene was again observed to reach a temperature of around 400° F. while the outside layer of the skin did not exceed the melting temperature of the skin. Furthermore, there was adhesion of the as formed foam layer to the crosslinked polypropylene skin and to the glass filled polypropylene substrate. Using a force gauge, it was observed that it required 14.5N of force to peel the skin material from the foam thereby indicative of cohesive failure (that is not a failure as between the surface of the foam and the surface of the skin).

What is claimed is:

1. A method for making an automobile trim component having a skin-foam-substrate structure, the method comprising:
supplying a skin material comprising a polyolefin elastomer having a density of 0.80 g/cc to 0.90 g/cc and a melting temperature in the range of 50° C. to 100° C.;
supplying a substrate material;
supplying a mixture of foamable polymer resin comprising crosslinked polypropylene having a gel content in the range of 15% to 85% and metal particles wherein the metal particles are present in the mixture at 5.0% by weight to 20.0% by weight;
positioning the mixture of foamable polymer resin and metal particles between the skin and substrate material, wherein the foamable polymer resin includes a chemical foaming agent and said chemical foaming agent is present at a level of 5.0 wt. % to 15.0 wt. %;
generating an electromagnetic induction field;
inductively heating the metal particles of the mixture via the electromagnetic induction field;
transferring the heat from the heated metal particles to the foamable polymer resin;
heating the foamable polymer resin, including the chemical foaming agent, with the heat from the inductively heated metal particles to a temperature for foaming of the foamable polymer resin while maintaining the skin and substrate at room temperature plus no more than a 30° F. temperature rise;
foaming the polymer resin with the chemical foaming agent to provide a foam layer between the skin and the substrate; wherein foaming is completed in less than or equal to 60 seconds; and
adhering the polymer resin to the skin material and the substrate material, while foaming the polymer resin, to form the automobile trim component wherein the foam layer has a thickness of 0.2 mm to 5.0 mm, a density of 2.0 pcf to 4.0 pcf and said skin layer has a thickness of 0.5 mm to 1.5 mm.

2. The method of claim 1 wherein the foamable polymer resin comprises polyurethane, polyolefin, ethylene-vinyl acetate (EVA), polypropylene (PP), ethylene propylene diene monomer (EPDM), thermoplastic elastomer (TPE) or polyisoprene.

3. The method of claim 2 wherein the foamable polymer resin is present in particle form at a diameter in the range of 100 µm to 2000 µm.

4. The method of claim 1 wherein the mixture of metal particles and foamable polymer resin comprises 0.5% by weight to 50.0% by weight of the metal particles and 99.5% by weight to 50.0% by weight of the foamable polymer resin.

5. The method of claim 1 wherein the metal particles comprise nickel, iron, cobalt, or rare earth metals.

6. The method of claim 1 wherein the chemical foaming agent comprising azodicarbonamide (ADCA), sodium bicarbonate, calcium carbonate, or a blend thereof.

7. The method of claim 1 wherein the metal particles of the mixture are inductively heated to a temperature in a range of 375° F. to 600° F.

8. The method of claim 1 wherein the metal particles of the mixture are inductively heated to a temperature in a range of 375° F. to 425° F.

9. The method of claim 1 wherein the metal particles have a diameter of 10 nanometers to 500 nanometers.

10. The method of claim 1 further comprising maintaining the skin and substrate at room temperature plus no more than a 20° F. temperature rise.

11. The method of claim 1 further comprising maintaining the skin and substrate at room temperature plus no more than a 10° F. temperature rise.

12. The method of claim 1 wherein foaming is completed in less than or equal to 45 seconds.

13. The method of claim 1 wherein foaming is completed in less than or equal to 30 seconds.

14. The method of claim 1 wherein foaming is completed in less than or equal to 15 seconds.

* * * * *